Dec. 30, 1969 J. D. CHRISTIAN 3,486,740
APPARATUS FOR TREATING FLOWABLE MATERIALS
Filed March 2, 1967 4 Sheets-Sheet 1

INVENTOR
JOSEPH DENNIS CHRISTIAN
By Irwin S. Thompson
ATTYS.

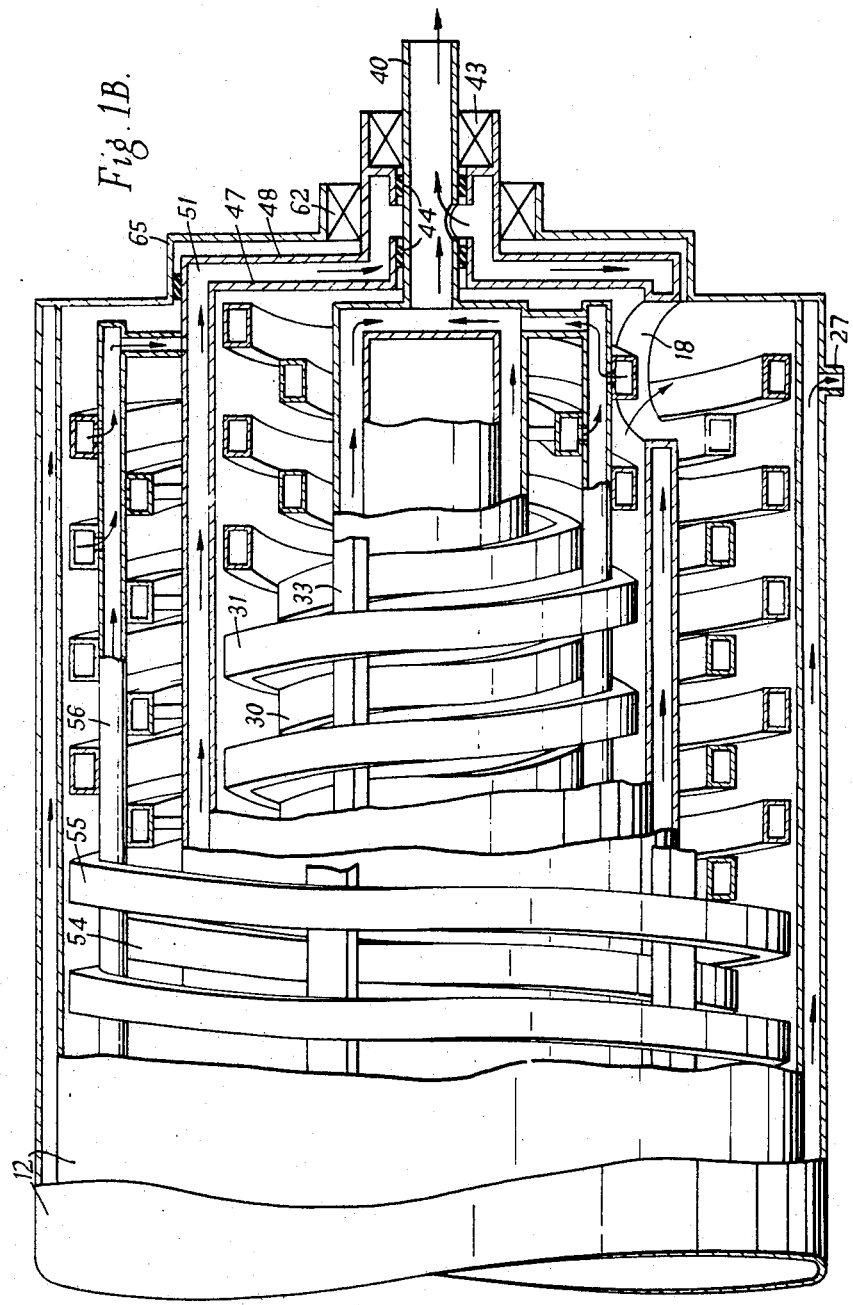

Dec. 30, 1969  J. D. CHRISTIAN  3,486,740
APPARATUS FOR TREATING FLOWABLE MATERIALS
Filed March 2, 1967  4 Sheets-Sheet 3

INVENTOR
JOSEPH DENNIS CHRISTIAN
BY Irwin D. Thompson
ATTY.

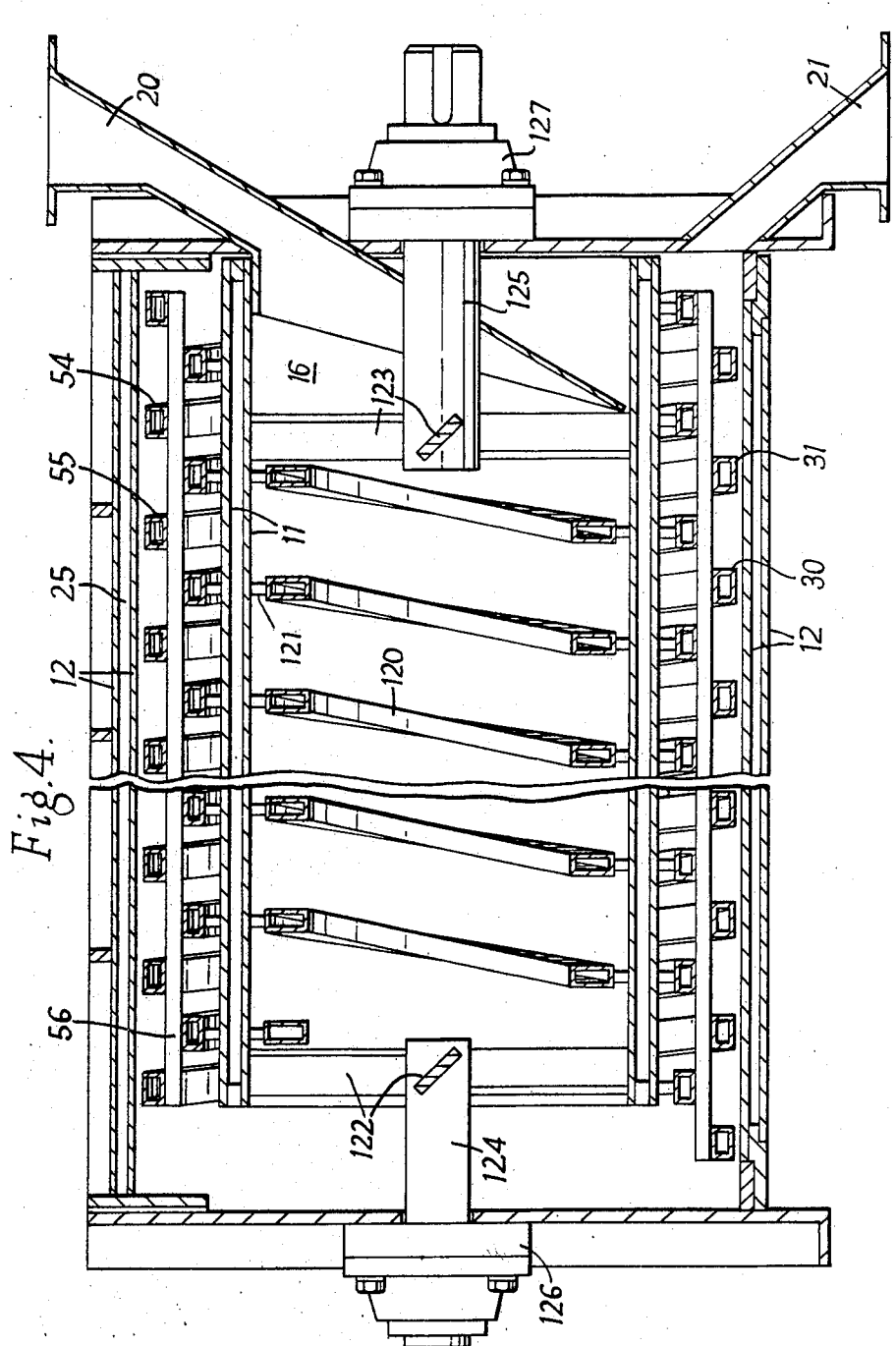

United States Patent Office 3,486,740
Patented Dec. 30, 1969

3,486,740
APPARATUS FOR TREATING FLOWABLE
MATERIALS
Joseph Dennis Christian, San Francisco, Calif., assignor to Packaged Power Terminals Inc., San Francisco, Calif.
Continuation-in-part of application Ser. No. 509,522, Nov. 24, 1965. This application Mar. 2, 1967, Ser. No. 620,066
The portion of the term of the patent subsequent to June 4, 1985, has been disclaimed
Int. Cl. B01f 15/02, 15/06; F28f 5/06
U.S. Cl. 259—2                                3 Claims

ABSTRACT OF THE DISCLOSURE

A mixing apparatus in which one or more cylinders are mounted rotatably within a housing and a tube is wound helically around each cylinder and carried by the respective cylinder and spaced from the respective cylinder and from the housing or another cylinder. The housing has an inlet and an outlet for the material to be treated. The helical devices and/or cylinders receive a heat exchange medium and the heated or cooled tubes convey the material through the housing.

---

This invention relates to apparatus for treating flowable materials. The material may be a particulate material or may be in the form of pieces or a soft mass or slurry and may be, for example, cement or pieces of meat or tomato puree or practically any other substance that can be mixed by helical ribbons. This application forms a continuation-in-part of my pending application No. 509,522, filed on Nov. 24, 1965, now Patent No. 3,386,708.

The apparatus may effect heat exchange between the material and a heat exchange medium which does not contact the material. The heat exchange medium may, for example, be steam, hot air or cold brine. Also the apparatus can be designed to inject a heat exchange medium or other substance into the material or may remove liquid or gas from the material. Also the apparatus can be designed solely for mixing and/or blending ingredients of the material, for example, potato shreds with powdered eggs, spices and flavouring. The apparatus may be arranged to carry out any required combination of these effects.

An important object of the invention is to build into a given space, a large amount of surface area serving for mixing or heat exchange. Further objects of the invention are to enable the material that is being treated to contact the maximum amount of such surface area to cause the material to be relocated constantly, that is to say, it must be in total continuous motion and no particles resting on any particular area for any great length of time. Another object is to provide maximum uniformity of mixing and blending of the material.

According to the invention the apparatus comprises a cylinder rotatably mounted within a housing and a helical device surrounding the cylinder and carried by the cylinder and spaced from the cylinder and from the housing, said housing having an inlet and an outlet for material to be treated.

The helical devices or ribbons and/or cylinders may be hollow to receive heat exchange medium. If desired the ribbons and/or cylinders may have openings communicating with the said channel for egress of a substance, e.g. steam, air or a fluid chemical preservative to be mixed with the material.

The invention will now be described by way of example with reference to the accompanying drawings wherein:

FIGURES 1A and 1B together form a vertical sectional view of an apparatus made in accordance with the invention;

FIGURE 4 is a vertical sectional view of a modified form of the apparatus.

Figure 1A:
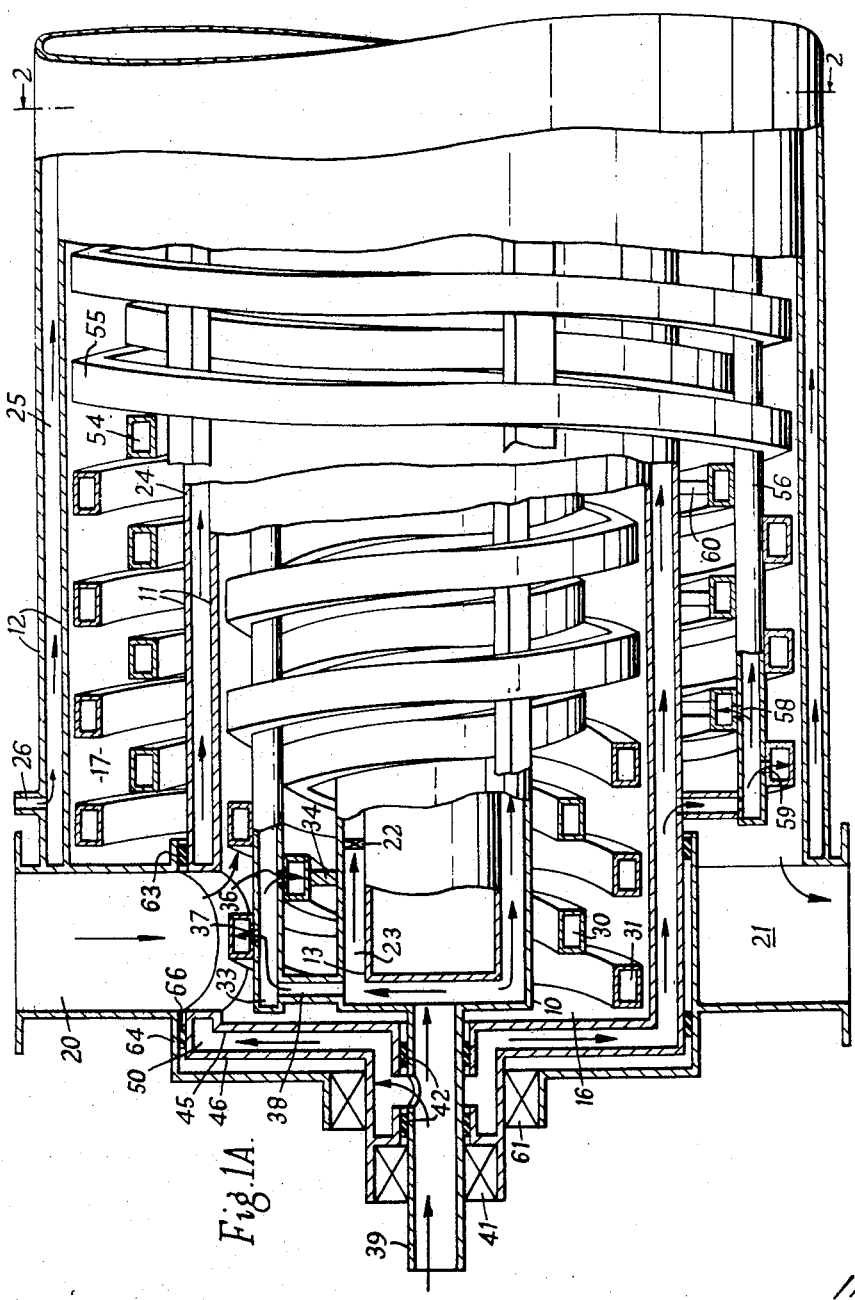
Figure 2:
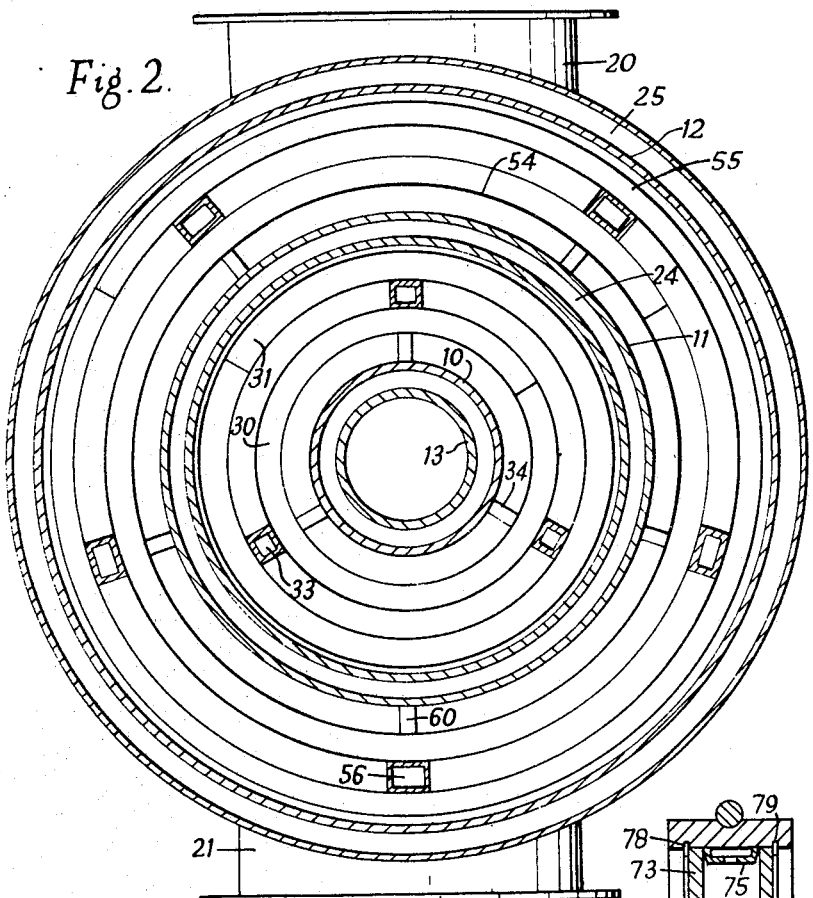
FIGURE 2 is a sectional view on the line 2—2 on FIGURE 1A.

The apparatus shown comprises a first cylinder 10, a second cylinder 11, a third cylinder 12 and a fourth cylinder 13. These cylinders are concentric with each other. Cylinders 10 and 11 are spaced apart to form a space 16 for material to be treated and cylinders 11 and 12 are spaced apart to form a space 17 which communicates by openings 18 in cylinder 11 with space 16 so that spaces 16 and 17 together form a channel leading from an inlet tube 20 leading to space 16 to a discharge tube 21 connected with space 17.

The fourth cylinder 13 is mounted by spiders 22 within the first cylinder to form a space 23. Cylinders 11 and 12 are double walled to form spaces 24, 25. Space 25 has an inlet 26 and outlet 27 for heat exchange medium.

In the space 16 is a tubular or hollow helical mixer ribbon assembly consisting of two tubular helices 30, 31. The helix 31 is of larger diameter than helix 30 and each turn of 30 is between two turns of the helix 31, i.e. the turns of 30 are offset from the turns of 31 along the axis. Across the helices 30, 31 along the apparatus are tubular lifting bars 33 for lifting the material. These bars are outside helix 30 and inside helix 31 and are connected to both helices. The helix 30 is also connected by studs 34 to the cylinder 10. Thus the cylinder 10, helices 30, 31 and bars 33 are all fixed together and rotate as a unit.

The helices 30, 31 communicate by apertures 36, 37 with the interior of the tubular bars 33 and the latter communicates by channel 38 with space 23. The cylinder 10 is carried by tubes 39, 40 at its opposite ends and these tubes rotate in bearings 41 and 43 and seals 42 and 44 carried by the double end plates 45, 46 and 47, 48 of the cylinder 11. These double end plates are spaced apart to form spaces 50, 51 which are in communication with the interior of pipes 39, 40 and with the spaces 24.

In the space 17 there is a second tubular helical mixer ribbon assembly consisting of similar inner and outer tubular helices 54, 55 connected to hollow lifting bars 56. The helices communicate by apertures 58, 59 with the hollow bars 56 and are connected thereto and the helix 54 is fixed to the cylinder 11 by studs 60 so that the cylinder 11, helices 54, 55 and bars 56 rotate as a unit independently of the first mixer ribbon assembly. This unit is mounted by bearings 61, 62 on end plates 64, 65 fixed to the cylinder 12.

Heat exchange medium fed to the pipe 39 passes through the spaces, apertures and channels referred to, through all four helices and all the hollow lifting bars and discharges through the pipe 40.

Other seals such as 66, 63 are provided where required. The helices may be seamless tubes and may be of any shape in section. The ends of the helices are blocked.

In the present design virtually all welding of the helical ribbons is eliminated. The terminals of these ribbons can be secured for rotation either by bolting or rivetting or by welding, but there is no welding required intermediate of the ends of the ribbons except the welding that is normally used to make the ribbons continuous spirals, that is, butting one length of tubing to the other and putting on it a circumferential weld so that it can be rolled into a spiral.

The cylinder 11 surrounding the inner ribbon serves as a heat exchange device and it is so designed that the inner surface of it provides heat exchange area to the smaller helices, and the outer surface of it provides heat exchange surface to the larger helices. This cylinder supports and drives the outer ribbons or helices 54, 55 for mixing the material and conveying it along the apparatus.

According to the hand of the inner helices 30, 31 the rotation of the cylinders 10, 11 causes a differential in speed that affects the actual rate at which the material can be conveyed.

The helical devices 30, 31 are shown as being right handed helices. If the cylinder 11 rotates in the same direction as the inner helical device and, for example, exactly at the same r.p.m. of this inner device, there would be no conveying action whatsoever. The material would just roll around with the cylinder and remain static. As this differential is changed by speeding up or slowing down the cylinder 11, conveying of the material takes place.

Since one helical device is larger than the other, one will run slower than the other and so it is possible by this differential feature to regulate the time of retention and the capacity and adjust the flow of material to compensate for the loss or the addition of moisture or whatever other effect might be had on it from change of density of volume or specific gravity.

The lifting bars are provided so that the material rotates with the helices and slips past the bars that cause this rotation. These bars may also spiral but in a very long pitch and preferably of opposite spiral direction to the helices 54, 55. For instance, if the length of the ribbons is 120" these lift blades may have a pitch of about 240". In other words, in one length of 120" they would spiral around the cylinder or the pipe about half way but the twist of that spiral would be opposite to the twist or the hand of the ribbon, so that as the material is lifted, it is also thrown back thus increasing the slippage, which increases the time of retention and permits higher rotational speed for a given volume delivery.

These bars are made out of rectangular tubing, and the outer ribbon or helix is permitted to ride on these bars in such a manner that they can expand or can contract, being only anchored at each end, i.e. there is no welding in between so it is a matter of rolling the coils and on the inner coil, welding on about three of the studs per turn, applying the bars and putting the outer helix over them.

If desired the bars may be spaced away from the helices. This can be done in either of two ways: either by increasing the diameter of the larger helix to make room for this spacing or by reducing the size of the bars and stud welding separation pieces.

If the apparatus is to be used solely for mixing or stirring the material the helices and cylinders need not be hollow.

Figure 3:
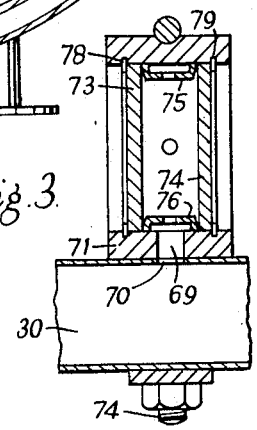
FIGURE 3 is a sectional view of an attachment to be described.

If desired the helices and/or cylinders may be provided with one or more openings communicating with the channel 16, 17. This can serve for introducing steam or air or other fluid media into the material or for extracting a fluid from the material. If the pressure in the hollow helices or cylinders is greater than the pressure in the channel 16, 17 the media will flow into the channel whereas if the pressure in the channel 16, 17 is greater than the pressure in the hollow helices or cylinders, fluid will be extracted from the material. To avoid clogging of the openings and to achieve efficient operation, the opening may lead to a distributing device, e.g. a porous wall. For example, as shown in FIGURE 3, an opening 70 in a helix 30 coincides with a hole 69 in a hollow block 71 that is clamped by U-bolts 74A to the helix. Within the block 71 are two plates 73, 74 of porous material spaced apart by spacers 75, 76 and held in place by snap rings 78, 79. By this means fluid from the helix 30 can escape in diffused condition through the porous plates 73, 74 into the material being treated.

In a simplified form of the apparatus the helical devices 30, 31, 33 and cylinder 13 are omitted. In this case the inlet 20 may lead directly to the space 17. Alternatively, the omitted parts may be replaced by a single hollow helical member as shown at 120 in FIGURE 4 and the member 120 is attached to the cylinder 11 by studs 121. In this arrangement the inlet 20 leads to the inner space 16. Means not shown may be provided for introducing heat exchange medium if required into the helices and/or double walled cylinders 11, 12. The double walled cylinder 11 is mounted by spiders 122, 123, on spindles 124, 125 which are mounted in bearings 126, 127 carried by the end walls of the housing or cylinder 12.

If desired the heat exchange medium after passing through the helices and/or space between the walls 11 may be returned through a central tube to the inlet end of the apparatus.

The apparatus may be arranged at a suitable inclination so that the material may gravitate along the inner or outer channel of the apparatus. The material may be assisted by aeration of fluidisation.

The outer diameter of the cylinder 11 is preferably at least sixty percent of that of the housing. The outer helical device 54, 55 is spaced both from the cylinder 11 and from the housing 12 and preferably occupies at least fifty percent of the radial distance from the cylinder to the housing. The pitch of the helices is usually less than three times the axial dimension of the helix.

The reference to "helical" in this specification and claims is intended to include all arrangements of the helices whereby they are wound around the cylinder, e.g. they may have a shape which is distorted from a true geometrical helix and may, for example, have some small parts that extend axially.

I claim:

1. Apparatus for treating flowable material comprising a cylindrical housing, a cylinder within the housing and spaced from the housing to provide a space through which material to be treated can flow in one axial direction along the housing, means mounting said cylinder for rotation relative to the housing, a first helical conveyor device in said space and fixed to the cylinder, said device comprising two helical members surrounding the cylinder, one of greater diameter than the other, the helices of one member being offset axially with respect to the helices of the other member, said helical members being of the same conveying direction toward one end of the apparatus, one end of said space being in communication at one end with the interior of the cylinder, a second helical device within the cylinder for conveying the material along the cylinder in the opposite direction, means mounting said second helical device on the inner wall of said cylinder at a plurality of points intermediate the length of said second helical device, a first conduit leading from outside the apparatus and terminating in the other end of said cylinder, and a second conduit leading from the other end of said space to outside the apparatus.

2. Apparatus for treating flowable material comprising a cylindrical housing, a cylinder within the housing and spaced from the housing to provide a space through which material to be treated can flow in one axial direction along the housing, means mounting said cylinder for rotation relative to the housing, said mounting means comprising spindles on which said cylinder is mounted adjacent the ends of the cylinder, a first helical conveyor device in said space and fixed to the cylinder, said device comprising two helical members surrounding the cylinder, one of greater diameter than the other, the helices of one member being offset axially with respect to the helices of the other member, said helical members being of the same conveying direction toward one end of the apparatus, one end of said space being in communication at one end with the interior of the cylinder, a second helical device within the cylinder for conveying the material along the cylinder in the opposite direction, said spindles being coaxial and spaced apart from each other along most of the axial extent of said second helical device, a first conduit leading from outside the apparatus and terminating in the other end of said cylinder, and a second conduit leading from the other end of said space to outside the apparatus.

3. Apparatus as claimed in claim 2, and radially extending spiders on said spindles by which said cylinder is supported on said spindles.

References Cited

UNITED STATES PATENTS

| | | | |
|---|---|---|---|
| 3,386,708 | 6/1968 | Christian | 165—87 |
| 158,246 | 12/1874 | Chesebrough | 165—87 |
| 1,224,981 | 5/1917 | Van Kuren | 165—92 |
| 1,717,465 | 6/1929 | O'Meara | 165—92 |
| 1,971,873 | 8/1934 | Peck | 165—92 |
| 3,049,413 | 8/1962 | Sifford | 165—87 X |

FOREIGN PATENTS 909,889  11/1962  Great Britain.

ROBERT A. O'LEARY, Primary Examiner

A. W. DAVIS, Assistant Examiner

U.S. Cl. X.R.

34—134; 165—87, 92; 259—9, 25, 49, 104